United States Patent
Annan et al.

(10) Patent No.: US 8,266,419 B2
(45) Date of Patent: Sep. 11, 2012

(54) FAST RESTART ON A VIRTUAL MACHINE

(75) Inventors: Brandon Christopher Annan, Westwood Hills, KS (US); Robert Burcham, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 322 days.

(21) Appl. No.: 12/625,890

(22) Filed: Nov. 25, 2009

(65) Prior Publication Data

US 2011/0125991 A1 May 26, 2011

(51) Int. Cl.
*G06F 15/177* (2006.01)
(52) U.S. Cl. .................... 713/1; 713/2; 713/100
(58) Field of Classification Search .............. 713/1, 2, 713/100
See application file for complete search history.

(56) References Cited

U.S. PATENT DOCUMENTS

| | | | | |
|---|---|---|---|---|
| 7,275,150 | B2 * | 9/2007 | Pagan | 713/1 |
| 7,441,113 | B2 * | 10/2008 | Chong et al. | 713/2 |
| 8,006,079 | B2 * | 8/2011 | Goodson et al. | 713/1 |
| 2002/0138506 | A1 | 9/2002 | Shuf | |
| 2003/0159130 | A1 | 8/2003 | Broussard | |
| 2004/0045011 | A1 * | 3/2004 | Chou | 719/320 |
| 2005/0204198 | A1 * | 9/2005 | Pagan | 714/36 |
| 2005/0243760 | A1 * | 11/2005 | Yoshioka | 370/328 |
| 2009/0217021 | A1 * | 8/2009 | Goodson et al. | 713/1 |

OTHER PUBLICATIONS

Nikolov et al. 'Recoverable Class Loaders for a Fast Restart of Java Applications.' Mobilware ? 08 [online], Feb. 12-15, 2008 [ retrieved on Jan. 10, 2011]. Retrieved from the Internet: <http://www.elib.edu.et/bitstream/123456789/14109/2/501026.pdf>. Abstract, section 1, para 1, 3, 5-6, section 2, para 1-3, section 4.1.1, para 1, section 4.3, para 3-4, section 4.4, para1-3.
PCT Search Report 10/57755 mailed Jan. 27, 2011. 7 pages.
Lennart Beringer and Stephen Gilmore, "Practical effectiveness of mobile virtual machines", Laboratory for Foundations of Computer Science, The University of Edinburgh, Edinburgh, Scotland.
Guangyu Chen and Mahmut Kandemir, "Improving Java Virtual Machine Reliability for Memory-Constrained Embedded Systems", Computer Science and Engineering Department, The Pennsylvania State University, DAC 2005, Jun. 13-17, 2005, Anaheim, California, USA.
Dr. James J. Hunt and Dr. Fridtjof B. Siebert, "Realtime programming in Java: Part 2, Part 2: Events, devices and safety critical Java", Mobile Handset DesignLine, May 26, 2006. http://www.mobilehandsetdesignline.com/188501082.
Emin Gün Sirer, et al., "A Practical Approach for Improving Startup Latency in Java Applications", Dept. of Computer Science & Engineering, University of Washington, Seattle, Washington, Feb. 26, 1999.

\* cited by examiner

*Primary Examiner* — M Elamin

(57) ABSTRACT

Media, methods, and computer systems are provided for performing a quick restart of applications in a virtual machine of the computer system. The virtual machine is configured with a critical object array that identifies the critical applications. In response to a quick restart request, the garbage collector operates in a quick restart mode to remove all objects for each application that is not in critical object array.

20 Claims, 3 Drawing Sheets

FAST RESTART ON A VIRTUAL MACHINE

SUMMARY

Embodiments of the invention are defined by the claims below. A high-level overview of embodiments of the invention is provided.

In a first embodiment, a computing device, such as a wireless device, may perform a quick restart in a virtual machine executing on a computing device. The virtual machine loads one or more applications into a memory of the computing device. In turn, a deployment descriptor associated with each application is read by the virtual machine to determine whether the application is a critical object. A critical object reference array is updated with a memory address of each application loaded by the virtual machine. In response to a quick restart request each application is removed from memory except applications identified in the critical object array.

BRIEF DESCRIPTION OF THE SEVERAL VIEWS OF THE DRAWINGS

Illustrative embodiments of the invention are described in detail below with reference to the attached drawing figures, which are incorporated by reference herein and wherein.

DETAILED DESCRIPTION

Figure 1:
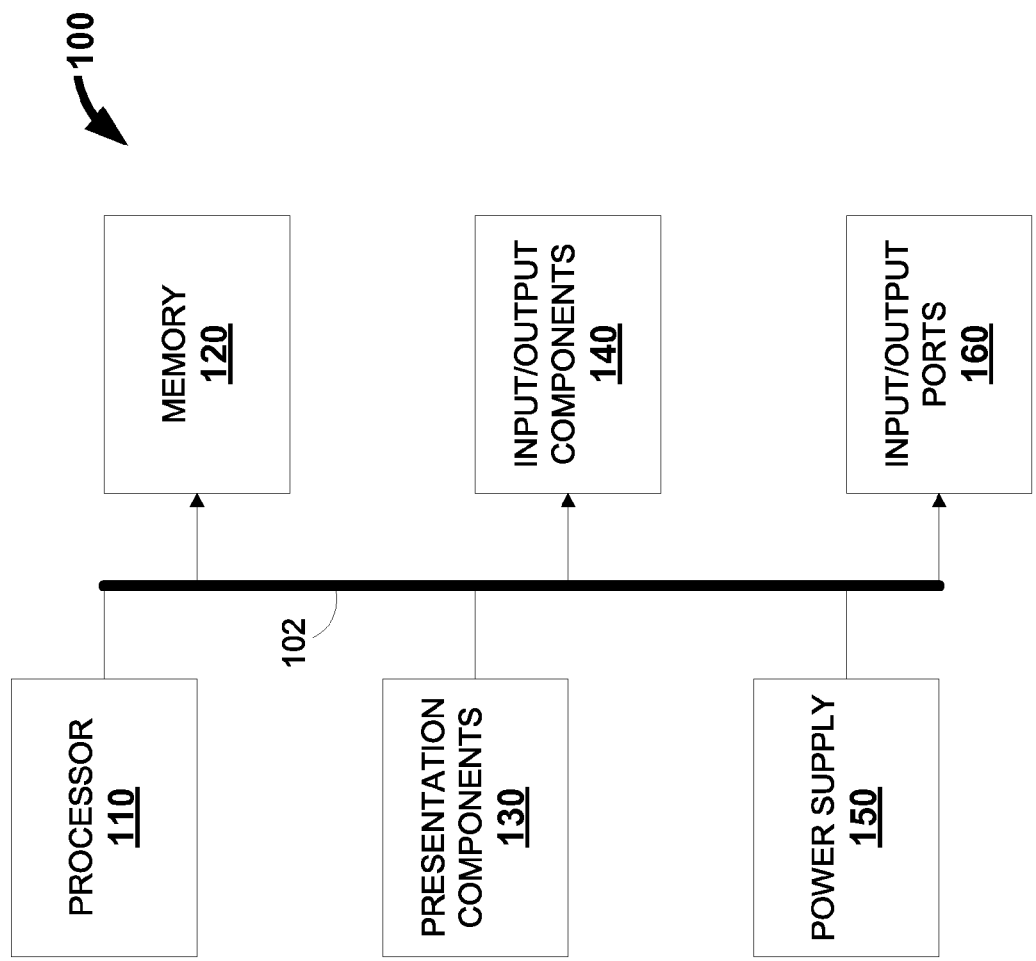
FIG. 1 depicts an exemplary operating environment of a computer system, such as a wireless device, in accordance with embodiments of the invention.

Embodiments of the invention provide methods, media, and computer systems that perform quick restart in a virtual machine (VM). The VM, such as Java virtual machine (JVM), executes an application framework. The application framework provides applications or services for the VM. In some embodiment, the application framework may be an Open Service Gateway Initiative (OSGI). The applications in the application framework may include deployment descriptors. The deployment descriptor for an application may identify the application as a critical application. In one embodiment, critical objects are the objects that are used by an application that was executed during initialization of the VM. The VM reads the deployment descriptor and updates a critical object reference array (CORA). When a quick restart request is generated, the garbage collector in the VM may operate in a quick restart mode, disregard a traditional application array, and clean all objects that are not in the CORA. Accordingly, the VM may instantaneously return to its initial state.

Throughout the description of the invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the embodiments of the invention. The following is a list of these acronyms:

CD-ROM Compact Disc-Read Only Memory
CORA Critical Object Reference Array
DVD Digital Versatile Discs
EEPROM Electronically Erasable Programmable Read Only Memory
GC Garbage Collector
I/O Input/Output
J2EE Java™ 2 Platform, Enterprise Edition
OSGI Open Service Gateway Initiative
PDA Personal Data Assistant
RAM Random Access Memory
ROM Read Only Memory
VM Virtual Machine Embodiments of the invention include, among other things: a method, system, or computer-program product. Accordingly, the embodiments may take the form of a hardware embodiment, a software embodiment, or an embodiment combining software and hardware. In one embodiment, the invention takes the form of a computer-program product that includes computer-useable instructions embodied on one or more computer-readable media.

Computer-readable media include both volatile and nonvolatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, DVD, holographic media, or other optical disc storage, magnetic cassettes, magnetic tape, magnetic disk storage, and other magnetic storage devices. These technologies can store data momentarily, temporarily, or permanently.

The computer system having the VM may be part of a datacenter having numerous server devices or storage devices. Alternatively, the computer system may be a client device, such as a personal computer, PDA, smart phone, or wireless device. The VM in the computer system is configured to perform the quick restart in response to a quick restart request. The quick restart request may be generated automatically or in response to a user request (e.g., administrator).

FIG. 1 depicts an exemplary operating environment of a computer system 100, such as a wireless device, in accordance with embodiments of the invention. The computer system 100 is but one example of a suitable environment and is not intended to suggest any limitation as to the scope of use or functionality of the embodiments of the invention. Neither should computer system 100 be interpreted as having any particular dependency or requirement relating to any one or combination of modules or components illustrated.

The computer system includes a bus 102 that directly or indirectly couples the following components: one or more processors 110, memory 120, one or more presentation components 130, input/output (I/O) components 140, I/O ports 160, and an illustrative power supply 150. Bus 102 represents what may be one or more buses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider presentation components 130, such as a display screen, to be an I/O component. Also, processors have memory. The inventors hereof recognize that such is the nature of the art, and reiterate that the diagram of FIG. 1 is merely illustrative of an exemplary mobile device 100 that can be used in connection with one or more embodiments.

Computer system 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, DVD or other optical or holographic media; magnetic cassettes, magnetic tape, magnetic disk storage or other magnetic storage devices.

Computer system 100 includes one or more processors 110 that read data from various entities such as memory 120 or I/O components 140. Memory 120 includes computer-storage media in the form of volatile and/or nonvolatile memory. Memory 120 may be removable, non-removable, or a combination thereof. Exemplary devices for memory 120 include solid-state memory, hard drives, optical-disc drives, etc. Presentation components 130 present data indications to a user or other device. Exemplary presentation components 130 include a display screen, speaker, vibrating module, etc. I/O ports 160 allow computer system 100 to be logically coupled to other devices including I/O components 140, some of which may be built in. Illustrative components include a keyboard, microphone, cursor or focus-movement buttons, satellite devices, touch pad or touch screen, scanner, etc.

As one of ordinary skill in the art will appreciate, the inner workings of even an unsophisticated mobile device can constitute thousands of components, instructions, and the like. As previously discussed, the ability to draw distinct lines is nearly impossible because of the interoperability of many of those components. A block diagram representing interaction of certain components of the computer system according to embodiments of the invention is depicted in greatly simplified form and will be described below. More specifically, this diagram represents the interaction of VM and application framework.

In one embodiment, a computer system is configured to perform quick restart. The computer system includes an application framework and a VM. The application framework hosts a number of applications. Each application in the application framework may be associated with a deployment descriptor that specifies whether the application is a critical application. The VM executes the application. The VM also includes a GC and loader. The loader loads each application into memory of the computer system. The GC cleans memory by operating in a normal mode, or in a quick restart mode in response to a quick restart request.

Figure 2:
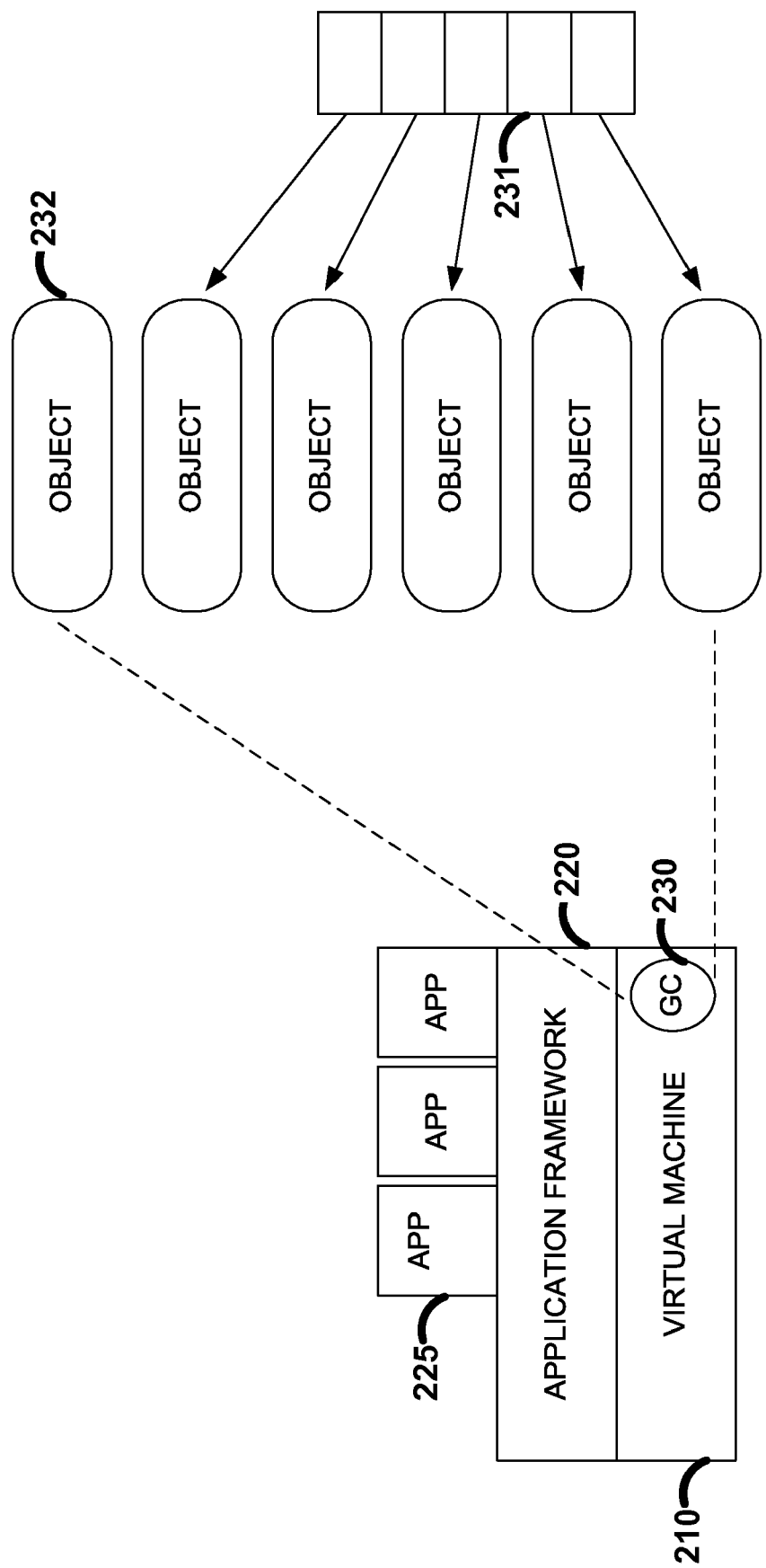
FIG. 2 depicts a simplified block diagram representing an exemplary virtual machine and application framework in accordance with embodiments of the invention.

FIG. 2 depicts a simplified block diagram representing an exemplary VM 210 and application framework 220 in accordance with embodiments of the invention. The VM includes a GC 230, and the VM 210 executes applications 225 in application framework 220.

The VM 210 maintains a CORA 231 to identify addresses of the objects 232 for critical applications. The VM 210 may be implemented using any one of Java™, OSGI, .Net™ PHP™, or Python™. The VM 210 includes a loader that is configured to load applications 225 in the application framework 220 into memory for the computer system. The VM 210 is configured to read deployment descriptors for the loaded applications. In some embodiments, the VM 210 updates the CORA 231 when the deployment descriptor of a loaded application indicates the application is a critical application. The CORA 231 may store memory addresses of all objects 232 associated with the loaded critical applications.

The application framework 220 stores numerous applications 225 that are available for execution my the VM 210. The application framework 220 may include Weblogic, Java, and other run time environments. The application 225 may include database applications, phone applications, news applications, map applications, game applications, image applications, and static applications. The static applications may include screen savers, text documents, html documents, or other static content. In some embodiments, the applications 225 may include deployment descriptors. The deployment descriptors may be included in the applications 225. Alternatively, the deployment descriptors may be separate files that are associated with the applications 225. For instance, the deployment descriptor may be an extensible Markup Language (XML) file or text file. In one embodiment, the application and deployment descriptor are digitally signed.

The GC 230 is configured to operate in one of a normal mode and quick restart mode. In the normal mode, the GC 230 accesses an application object array that stores the memory address for each object associated with all the loaded applications. The VM 210 updates the application object array by tagging each object that the loaded applications handle. When an object lacks an application handle, the GC 230 collects the object and frees the memory that was used by the object. In some embodiments, the GC 230 may compress memory blocks that were recently freed.

In quick start mode, the GC 230 accesses the CORA 231. The GC 230 destroys everything except the object included in the CORA 231. The objects 232 for the applications 225 in the CORA 231 continue running after the quick restart reset. The GC 230 enters into quick restart mode when a quick restart is received from the VM 210.

The CORA 231 stores the critical objects 232. These objects 232 may include midlet containers, servlet containers, or application model containers. The midlet container stores the Java applications. The servlet container stores the server applications, and the application model container stores other local computer system applications. The CORA 231 may be an array of pointers to the objects 232. When a restart becomes necessary (e.g. memory leak, application install or upgrade, administrator request, user request), all objects that are running in the VM 210 are destroyed except for the critical objects 232. The quick restart effectively resets the VM 210 and the application framework 220 by placing the VM 210 and application framework 220 in a start state. This returns the VM 210 to the start state without incurring startup delays corresponding to the applications 225 associated with the critical objects 232.

In one embodiment, the VM on a computer device executes a quick restart automatically or in response to a user quick start request. The VM returns to a start state by running a quick start GC in the response to the quick start request. The VM reads to CORA to determine which applications must be removed from memory.

Figure 3:
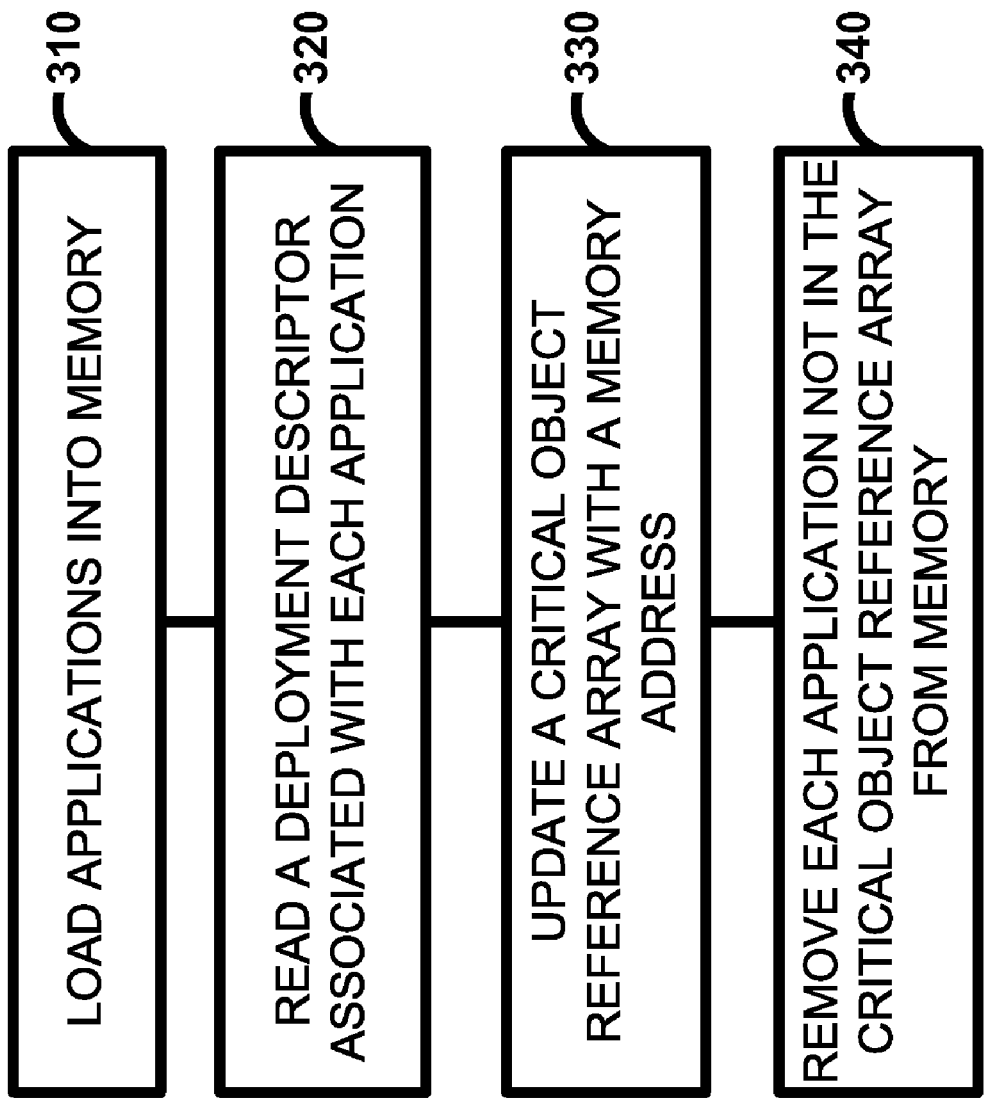
FIG. 3 depicts a flowchart representing a method of performing quick restart in accordance with embodiments of the invention.

FIG. 3 depicts a flowchart representing a method of performing quick restart in accordance with embodiments of the invention. In step 310, a VM loads one or more applications into a memory of the computer device. The applications may include game applications, weather applications, news applications, phone applications, image applications, and static applications. In certain embodiments, the computer device is a wireless device. The VM reads a deployment descriptor associated with each application to determine whether the application is a critical object, in step 320. The application and deployment descriptor may be digitally signed to prevent unauthorized manipulation. The deployment descriptor may be an attribute of the application, or a separate file associated with the application.

The deployment descriptor of the phone application identifies the phone application as a critical object. A CORA is updated with a memory address of each loaded application, in step 330. The CORA is accessible by a GC that frees memory for the applications. In one embodiment, the GC includes at least two modes: a normal mode and a quick restart mode. The GC collects the objects for applications not in the CORA in quick start mode but in normal mode the GC collects objects that lack handles from one or more applications. In turn, each application is removed from memory except applications identified in the CORA, in response to a quick restart request, in step 340.

In an alternate embodiment, the VM includes two GCs: a normal GC and a quick start GC. The VM may also include an application object array having an address for each object loaded in memory. For each object loaded in memory, the VM tags the loaded objects in the application object array to indicate whether an application is handling the object. The CORA is accessible by the quick restart GC, and the application object array is accessible by a normal GC. The quick start GC and normal GC may execute in parallel. In one embodiment, the quick start garbage collector may access the application object array to updated the handles when a quick restart request is received. The normal GC frees memory by removing each object that is not tagged to indicate that an application is handling the object. On the other hand, the quick start GC collects all objects associated with applications not in the CORA to return the VM to a start state.

In summary, a VM may quickly restart in response to a quick restart request. The quick restart request may be generated automatically or in response to a user command. For instance, a VM may execute multiple applications having varying memory allocation routines. One of the applications may have a memory allocation routine that creates memory leakage, i.e., allocating memory without freeing the memory upon termination of the application. The VM may be configured with a rule that causes the VM to automatically generate the quick start request when memory usage goes above a specified threshold. For instance 85% of total memory available to the computer device executing the VM. Alternatively, the quick restart request may be issued as an administrative function when installing new applications, or updating logs.

Many different arrangements of the various components depicted, as well as components not shown, are possible without departing from the spirit and scope of the present invention. Embodiments of the invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method to perform a quick restart in a virtual machine executing on a computing device, the method comprising:
loading, by a virtual machine, one or more applications into a memory of the computing device;
reading a deployment descriptor associated with each application to determine whether the application is a critical object;
updating a critical object reference array with a memory address of each application loaded; and
removing each application from memory except applications identified in the critical object array, in response to a quick restart request.

2. The computer-implemented method of claim 1, wherein the device is a wireless device.

3. The method of claim 1, wherein the one or more applications are one of: game applications, weather application, news applications, phone applications, image applications, and static applications.

4. The method of claim 3, wherein the deployment descriptor of the phone application identifies the phone application as a critical object.

5. The method of claim 1, wherein the deployment descriptor is an attribute of the application.

6. The method of claim 1, wherein the deployment descriptor is a separate file associated with the application.

7. The method of claim 1, wherein the application and deployment descriptor are digitally signed.

8. The method of claim 1, wherein the critical object reference array is accessible by a garbage collector.

9. The method of claim 1, wherein the garbage collector frees memory for the applications.

10. The method of claim 9, wherein the garbage collector includes at least two modes: a normal mode and a quick restart mode.

11. The method of claim 10, wherein the garbage collector collects the objects for applications not in the critical object reference array in quick start mode but in normal mode the garbage collector collects objects that lack handles from one or more applications.

12. One or more non-transitory computer-readable media with computer-executable instructions embodied thereon for performing a method to quick restart a virtual machine, the method comprising:
loading, by a virtual machine, one or more applications into a memory of the computing device;
reading a deployment descriptor associated with each application to determine whether the application is a critical object;
updating a critical object reference array with a memory address of each application loaded; and
removing each application from memory except applications identified in the critical object array, in response to a reset request.

13. The media of claim 12, further comprising an application object array having an address for each object loaded in memory and a tag for each object that indicates whether an application is handling the object.

14. The media of claim 13, wherein the critical object reference array is accessible by a quick restart garbage collector and the application object array is accessible by a normal garbage collector.

15. The media of claim 14, wherein the normal garbage collector frees memory by removing each object that is not tagged to indicate that an application is handling the object.

16. The media of claim 14, wherein the quick start garbage collector collects all objects associated with applications not in the critical object reference.

17. The media of claim 14, wherein the quick start garbage collector and normal garbage collector execute in parallel and the quick start garbage collector updates the application object array.

18. A computer system configured to perform quick restart, the computer system comprising:
an application framework configured to host a number of applications, wherein each application is associated with a deployment descriptor that specifies whether an application is a critical application; and
a virtual machine configured with a garbage collector and loader, the loader loads each application into memory, and the garbage collector is configured to clean memory by operating in a normal mode, or in a quick restart mode in response to a quick restart request.

19. The computer system of claim 18, wherein the quick restart is requested automatically or by a user of the computer system.

20. The computer system of claim 19, wherein the quick restart request is generated automatically based on rules configured for the computer system to prevent memory leakage.

* * * * *